NON-SATURATING TRANSISTOR TRIGGER CIRCUITS

Filed June 29, 1954 2 Sheets-Sheet 1

INVENTORS: J. G. LINVILL
R. L. WALLACE JR.
BY Harry C. Hart
ATTORNEY

INVENTORS: J.G. LINVILL
R.L. WALLACE JR.
BY Harry C. Hart
ATTORNEY

United States Patent Office 2,880,330

Patented Mar. 31, 1959

2,880,330

NON-SATURATING TRANSISTOR TRIGGER CIRCUITS

John G. Linvill, Whippany, and Robert L. Wallace, Jr., Plainfield, N.J., assignors to Bell Telephone Laboratories, Incorporated, New York, N.Y., a corporation of New York Application June 29, 1954, Serial No. 440,062

8 Claims. (Cl. 307—88.5)

This invention relates to transistor trigger circuits. Its principal object is to increase the speed of operation of such a circuit. A related object is to render the end conditions of the oscillations of such a circuit independent of the transistor or transistors employed.

In general, the action of a transistor trigger circuit comprises a rapid cumulative swing from one extreme of current and potential conditions to another, being limited at one end of the swing by cut-off and at the other end by saturation. In the course of this swing, or "switching transient" as it is sometimes termed, the transistor behaves to a large extent as a linear amplifier and can respond with rapidity to the influences which cause this action; but at the saturation-limited extreme of its swing the transistor becomes sluggish. That is to say, once the transistor has reached its saturation condition, time is required to recondition it for linear operation and so for the following swing. It has been found that the sluggishness of the saturated transistor is a principal factor in determining the speed of operation of the trigger circuit as a whole.

The invention provides a remedy for this situation. By the inclusion in the circuit of a threshhold-responsive device suitably connected and suitably adjusted to change its condition at a potential which is short of the transistor saturation potential, the transistor is permitted to remain continually in its linear operation condition, and the switching transient is now terminated, not by the alteration of the transistor conditions, but by the alteration of the response of the threshold device.

Furthermore, the employment of certain suitably selected constant-voltage elements in conjunction with the threshold-responsive device renders the magnitudes of the output currents and voltages at which the switching transient terminates virtually independent of the transistor.

While the threshold device or the constant-voltage element may have any structural form provided it has the desired characteristics, it turns out that a semiconductor P–N junction alloy diode, as described by Pearson and Sawyer in the Proceedings of the Institute of Radio Engineers for November 1952 (volume 40, page 348) can be adjusted to serve either purpose. For the purpose of the threshold-responsive device it is adjusted to shift from its high-resistance condition to its broken-down condition in the course of the switching transient. To serve as a constant-voltage device, it is adjusted, on the other hand, to remain continuously in its broken-down condition.

Many transistor trigger circuits are known. Among these one of the more important is the Eccles-Jordan circuit comprising a pair of transistors, the collector electrode of each being cross-coupled to the base electrode of the other. With conductive cross-coupling such a circuit can be adjusted to be bistable. Furthermore, its upper operating frequency is limited by the sluggishness of one of the transistors or the other at the saturation end of its wing.

In accordance with the invention in a preferred form a pair of oppositely poled threshold devices, such as the breakdown diodes described by Pearson and Sawyer in the aforementioned publication, interconnect the two collector electrodes. Each of them is proportioned, in the fashion described by Pearson and Sawyer, to present a low forward direction resistance and, in the reverse direction, to present a high resistance throughout a preassigned voltage range and a very low variational resistance for reverse voltages beyond this range. The range is so selected that the breakdown of one of the diodes takes place when the voltage from one of the collector electrodes to the other is less, by a safe margin, than the full collector-to-collector voltage swing which would otherwise take place. Similarly the other diode breaks down when the collector-to-collector voltage drop is of the same magnitude and of opposite sign. Thus, on each swing, one or the other of the diodes limits the voltage excursion of the collector electrode of one transistor to a voltage which is short of saturation. Incidentally, it acts at the same time to limit the voltage excursion of the emitter electrode of the other transistor to a voltage which is short of cut-off. It follows that, when the switching transient is completed, both transistors remain in their linear operation conditions and are ready to undergo another switching transient without delay.

With A.-C. coupling in one or both of the cross-linking paths from collector to base, such a circuit becomes monostable or astable and may be operated in one or the other of these two fashions by minor potential adjustments. Breakdown diodes may also be advantageously employed with such circuits to hold the transistors in their linear operating conditions and so accelerate the inception of the switching transient.

Trigger circuits are also known which employ a single transistor instead of two. An example of such a circuit is the blocking oscillator in which the collector is inductively coupled to the emitter or, alternatively, and with a change of polarity of the coupling, to the base. The upper limiting operating frequency of such circuits as they are presently known is to a large extent determined by the sluggishness manifested by the transistor when it has been driven to saturation. A breakdown diode or other threshold device may advantageously be associated with such a circuit to restrict the extreme of collector voltage swing to a value short of saturation and so to hold the transistor continuously in its linear operating condition.

While the invention is applicable to transistors in general it is of special importance in connection with junction transistors for which saturation sluggishness has been a more serious matter than it has been for point contact transistors.

The invention will be fully apprehended from the following detailed description of preferred illustrative embodiments thereof, taken in connection with the appended drawings, in which.

Figures 1, 1A:
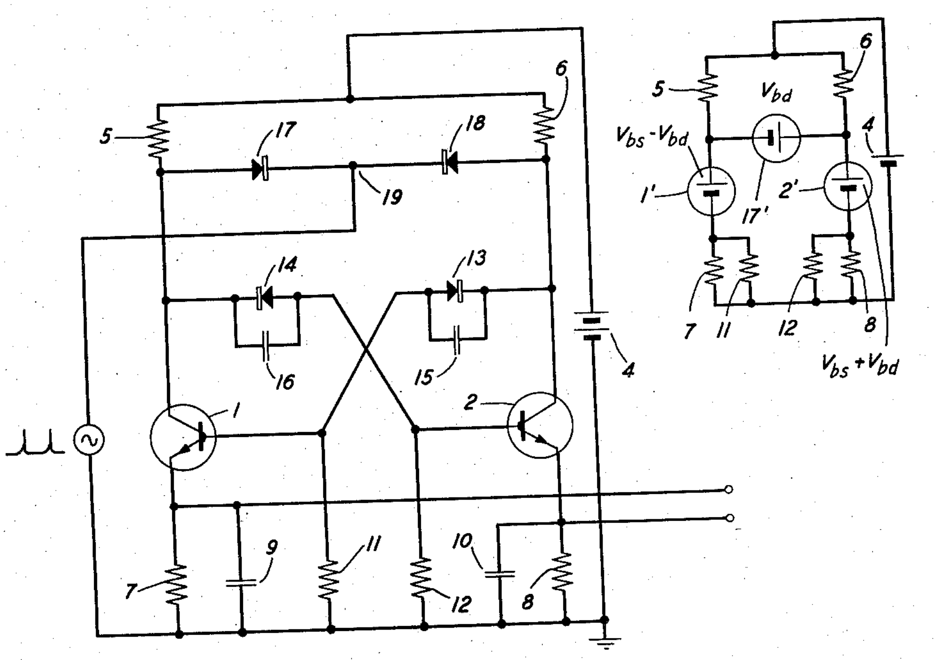
Fig. 1 is a schematic circuit diagram showing the application of the breakdown diodes of the invention to a two-transistor bistable trigger circuit of the Eccles-Jordan variety.
Fig. 1A is a simplified equivalent circuit referred to in the explanation of the operation of the circuit of Fig. 1.

Referring now to the drawings, Fig. 1 shows a bistable transistor trigger circuit of the Eccles-Jordan variety comprising two transistors 1, 2. Each transistor comprises a semiconductive body, a base electrode, an emitter electrode and a collector electrode. The several electrodes are individually identified by conventional symbols. The outward-pointing arrowhead on the emitter electrode indicates that the transistor is P-type for operation with the potential sources having the polarities shown. N-type transistors might equally well be employed, in which case the polarities of all potential sources should be reversed. Furthermore, the transistors 1, 2, are preferably, though not necessarily, of the junction type as distinguished from the point contact type.

Resistors 5, 6, interconnect the respective collector electrodes with one terminal of an operating potential source 4 and resistors 7, 8, interconnect the emitter electrodes of the transistors 1, 2, with the other terminal of the same potential source 4, which may be grounded. The resistors 7, 8, are shunted by condensers 9, 10, for a reason explained below. The base electrode of the first transistor 1 is maintained at the proper operating potential by connection to an appropriate point of a voltage divider comprising a resistor 11, a diode 13 whose function will be described below, and the resistor 6. The base electrode of the right-hand transistor 2 is similarly connected for the same purpose to an appropriate point of a voltage divider comprising a resistor 12, a diode 14 and the resistor 5. The collector of each transistor is cross-coupled to the base electrode of the other transistor by way of diodes 13, 14, and these diodes may be by-passed by condensers 15, 16.

In accordance with the invention an additional path interconnects the collector electrodes of the transistors 1, 2, and comprises at least one threshold device such as a breakdown diode, and preferably two such devices 17, 18, oppositely poled. The terminal 19 which is common to these two diodes 17, 18, serves as a convenient input point at which trigger pulses derived, for example from a pulse source 20, may be applied to the circuit. The resistors 7, 8, are paralleled with condensers 9, 10, which, by virtue of their storage of energy in either of the two stable states, provide a "memory." The presence of the energy stored in the "memory" elements, in combination with the functioning of diodes 17, 18, causes the circuit to assume alternate stable states as successive pulses are applied at the point 19.

In examining the operation of the system, suppose that the left-hand transistor 1 is in its low conduction condition and the right-hand transistor 2 is in the high conduction condition, and that a pulse has been applied to the trigger pulse input point 19 of a character to initiate a switching transient; i.e., to increase conduction of the left-hand transistor 1 and reduce conduction in the right-hand transistor 2. This state of affairs proceeds to increase cumulatively in well-known fashion; and were it not for the breakdown diodes 17, 18, would ultimately drive the right-hand transistor 2 to cut-off and the left-hand transistor 1 to saturation. At these points amplification by the transistors, and therefore regeneration in the system as a whole, cease so that the switching transient is arrested. However, as described above, if the switching transient is permitted to process this far, the initiation of another transient in opposite sense is impeded by the sluggishness of the saturated transistor.

But by virtue of the inclusion of the breakdown diodes 17, 18, after the transient has proceeded to such a point that the right-hand transistor 2 is approaching cut-off and the left-hand transistor 1 is approaching saturation the difference between the potential of the left-hand collector electrode, which is still falling, and the potential of the right-hand collector electrode, which is still rising, reaches a magnitude $V_{bd}$ such that the diode 17 breaks down by reason of its inherent characteristics. It holds its breakdown voltage with substantially no change despite any tendency on the part of the external circuit to alter it. In the broken-down condition the variational resistance of the diode 17 is very small, so that the series combination of this variational resistance with the forward resistance of the diode 18 constitutes a virtual short-circuit connection between the collectors of the two transistors 1, 2, which shortly and firmly arrests the increase of the potential difference between them. Thus, the switching transient has been fully terminated without driving the right-hand transistor 2 to cut-off, or the left-hand transistor 1 to saturation.

Once the switching transient has been arrested, reactive energy stored in the condensers 9, 10, settles to the steady value which characterizes the stable state in which transistor 1 conducts more heavily than transistor 2 and the system is completely at rest and is ready without further delay for the initiation of a new switching transient in the opposite direction. This new switching transient, like its predecessor, may be initiated by the application of a pulse to the terminal 19.

The following consideration of the circuit in this quiescent state reveals that the potentials are virtually independent of the transistors. Diode 17 is conducting in the reverse direction and diode 18 in the forward direction. The voltage drop from the collector of transistor 2 to the collector of transistor 1 is thus $V_{bd}$. Both transistors are conducting and, characteristically, have very small base-to-emitter voltages, negligible when compared to the other voltages in the circuit. Diodes 13 and 14, which are selected to have breakdown voltages $V_{bs}$ larger than $V_{bd}$ by a desired amount, are conducting in the reverse direction, maintaining the voltage from the collector of transistor 1 or 2, respectively, to the base of transistor 2 or 1, respectively, at the value $V_{bs}$. The collector-to-emitter voltage of transistor 1 is $V_{bs}-V_{bd}$, that of transistor 2, $V_{bs}+V_{bd}$. Thus the voltages across resistors 5, 6, 7, 8, 11, 12 are virtually identical with those in the simplified equivalent circuit of Fig. 1A. Accordingly, these potentials are independent of the transistor, being dependent only upon the voltage of the supply source 4, the magnitudes of the various resistors, and the diode breakdown voltages.

The next switching transient, like its predecessor, is initiated by the application of a pulse to the terminal 19. This pulse adds to the current being carried by diode 17 and subtracts from that being carried by diode 18, shortly bringing the current in diode 18 to zero and causing it to "open"; i.e., to enter its high resistance condition. Thereupon all of the pulse current goes into diode 17 and is coupled to the base of transistor 2. The collector of transistor 2, now free of the constraint of diode 18 regeneratively acts on transistor 1 to cumulatively bring its collector current down while that of transistor 2 increases. Still later in the progress of the switching transient the diode 18 breaks down, thus establishing an effective short-circuit between the collector electrodes and terminating the switching transient at a point short of cut-off for the transistor 1 and short of saturation for the transistor 2.

It follows from the complete symmetry of the circuit of Fig. 1 that the potential reached by the terminal 19 at one stable end condition of the switching transient is of the same magnitude as the potential which terminal 19 reaches at the other extreme condition of the switching transient. Hence, if attention be restricted to these two end conditions the potential of the terminal 19 does not change. Since any fluctuations of its potential during the course of the switching transient will have disappeared before the end condition has been reached, terminal 19 may fairly be described as a point of effectively fixed potential.

Figure 2A:
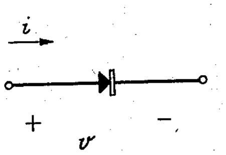
Figs. 2A and 2B show a single breakdown diode and its voltage-current characteristic.
Figure 2B:
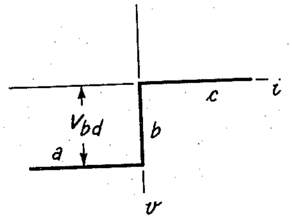

Fig. 2A shows a breakdown diode as described in the Pearson-Sawyer publication above referred to, poled for conduction in the forward direction from left to right, and Fig. 2B shows its current-voltage characteristic, idealized to the extent that its several portions are exactly parallel with the current and voltage axes, instead of very nearly so. Starting from a rest condition, as the voltage across the device is increased only slightly in the positive direction current commences to flow and flows easily. Starting, however, from the same rest condition, as the voltage is increased in the opposite direction, substantially no current flows until the voltage has reached the breakdown voltage, termed "$V_{bd}$," for the device. At this value of voltage, current commences to flow in the reverse direction and flows easily for any minute further increase in voltage, large or small. Thus the characteristic comprises three portions: a central portion in which virtually no current flows for voltages lying between zero and $V_{bd}$, and throughout which the resistance of the device is substantially infinite or at least very high, and two branch portions throughout each of which the variational resistance exhibited by the device is substantially zero or at least very low. One of these branches extends from the central portion at zero voltage in one direction and the other branch extends from the central portion at the voltage $V_{bd}$ in the opposite direction.

Figure 3A:
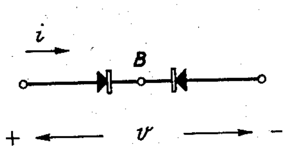
Figs. 3A and 3B show an oppositely poled pair of breakdown diodes and their current-voltage characteristic.
Figure 3B:
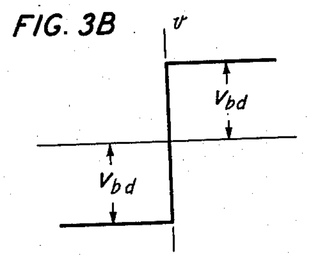

Evidently, when two devices as shown in Fig. 2A are connected in series and in opposing relation as shown in Fig. 3A, the voltage-current characteristic of the combination is as shown in Fig. 3B. Evidently, too, this combination of two opposed breakdown diodes when connected in the circuit of Fig. 1 operates to restrict the extreme potential difference between the collector electrodes of the two transistors to the magnitude $V_{bd}$ in one sense when the action is to prevent saturation of one transistor and in the other sense when its action is to prevent saturation of the other transistor.

With transistors 1, 2, of conventional construction and having conventional characteristics, suitable values for the circuit constants are as follows:

$R_5=R_6=10{,}000$ ohms
$R_7=R_8=2{,}000$ ohms
$R_{11}=R_{12}=100{,}000$ ohms
$C_9=C_{10}=470$ $\mu\mu$f.
$C_{15}=C_{16}=4$ $\mu$fd.
$E_4=45$ volts An appropriate value for the breakdown voltage of the diodes 17, 18, is 6.5 volts. An appropriate value for the breakdown voltage of the diodes 13, 14, is 8 volts. With the foregoing values for $R_{11}$ and $R_{12}$, the diodes 13, 14, are then maintained continuously in their broken-down states. Thus each of them serves the same purpose as would a battery of the same voltage connected between the same points. But, because of its smaller size and electrostatic capacitance and its greater constancy of voltage, it is far superior, as a circuit element for maintaining constant electrode voltage, to a battery. Each of these supplementary breakdown diodes 13, 14, may be bypassed by a condenser 15, 16, in accordance with standard practice for the cross-coupling links of a bistable circuit.

In the common circuits in which the switching transient is terminated by saturation of the transistor, this mode of termination not only imposes an upper limit to the operating frequency but it also presents difficulties sometimes encountered in transistors when the emitter is back-biased for substantial periods of time. The present invention, by virtue of its "division of labor" between the transistor and the breakdown diodes not only increases the upper operating frequency limit but, in addition, it permits each transistor to remain continuously in its active or operating state; i. e., its most reliable state.

Figure 3C:
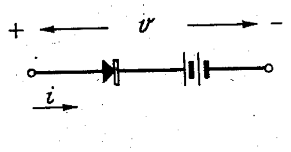
Fig. 3C shows an alternative to the structure of Fig. 3A.

The voltage-current characteristic of Fig. 3B, which is obtained, as described above and as shown in Fig. 3A, by the connection of the two breakdown diodes 17, 18, with opposite polarity, may also be secured by the combination of a single breakdown diode and a battery as shown in Fig. 3C. In this case the diode is to be fabricated and selected to have a breakdown voltage $V'_{bd}$ of twice the magnitude of the breakdown voltage of either of the diodes of Fig. 3A, while the battery should have a voltage of half this magnitude; i. e., $$E_B=\tfrac{1}{2}V'_{bd}=V_{bd}$$

Hence the combination of Fig. 3C may in principle be employed in the combination of Fig. 1 to replace the combination of Fig. 3A. It suffers from the obvious disadvantage, however, that it utilizes a battery with the attendant hazards of high capacity, large bulk, short life, etc. Furthermore, there is with this modification no longer a convenient point which is symmetrically located with respect to both transistors for the application of pulses. Despite these disadvantages it may, under some circumstances, be found useful. Inasmuch as it provides the same overall current-voltage characteristic, it permits cross-coupling by way of breakdown diodes 13, 14, as in the case of Fig. 1.

Figure 4:
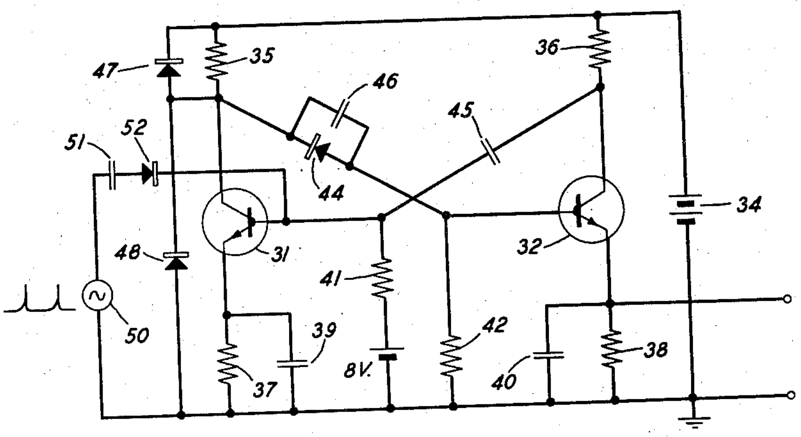
Fig. 4 is a schematic circuit diagram showing a modification of the circuit of Fig. 1 for monostable operation.

Fig. 4 shows two P-type transistors 31, 32, whose collector electrodes are connected by way of supply resistors 35, 36, to the positive terminal of a potential source 34, their emitter electrodes being similarly connected by way of resistors 37, 38, to the negative terminal of the source 34 which may be grounded. The emitter resistors 37, 38, are by-passed by condensers 39, 40. The base electrode of the right-hand transistor 32 is connected by way of a resistor 42 to ground and the base electrode of the left-hand transistor 31 is connected by way of a resistor 41 to a point of an intermediate potential such as 8 volts. The collector electrode of the right-hand transistor 32 is cross-coupled by way of a condenser 45 to the base electrode of the left-hand transistor 31. The collector electrode of the left-hand transistor 31 is cross-coupled by way of a breakdown diode 44, shunted by a condenser 46, to the base electrode of the right-hand transistor 32. By reason of the asymmetry in the cross-coupling links this circuit is monostable, and its one stable condition is that in which the left-hand transistor rests at or near cut-off while the right-hand transistor rests at or near saturation. Pulses, originating for example in a source 50, may be applied by way of a condenser 51 and an ordinary crystal diode 52 to the base electrode of the left-hand transistor 31. Application of any such pulse initiates a switching transient, causing the conduction conditions of the two transistors to be reversed for a time. During the time when transistor 31 is conducting more heavily, condenser 45 is charged from resistor 36 and battery 34. The base of transistor 31 cannot be maintained at a sufficiently high potential to perpetuate the high conduction of transistor 31, which is after a time regeneratively returned to its initial state of low conduction. Suitable magnitudes for the circuit constants are as follows:

$R_{35}=10{,}000$ ohms
$R_{36}=15{,}000$ ohms
$R_{37}=R_{38}=3{,}000$ ohms
$R_{41}=15{,}000$ ohms
$R_{42}=100{,}000$ ohms
$C_{39}=400$ $\mu\mu$f.
$C_{40}=100$ $\mu\mu$f.
$C_{46}=4$ $\mu$f.
$E_{34}=45$ volts In accordance with the present invention two additional breakdown diodes 47, 48, are employed. One of them 47 is connected between the collector electrode of the left-hand transistor 31 and the positive terminal of the source 34 and its breakdown voltage threshold may be adjusted to about 35 volts. The other diode 48 is connected between the collector electrode of the left-hand transistor 31 and the negative terminal of the source 34 and its breakdown threshold is adjusted to about 15 volts (with N-type transistors the polarities of the voltage sources and of these breakdown diodes should be reversed).

From the foregoing description of the operation of the circuit of Fig. 1 it will be apparent that, in Fig. 4, when the potential of the collector electrode of the left-hand transistor 31 exceeds 15 volts the lower diode 48 breaks down and when, on the other hand, the potential of the same collector electrode is less than 10 volts the upper diode 47 breaks down. The breakdown of one of these diodes prevents the left-hand transistor 31 from reaching its saturation condition and the breakdown of the other diode prevents the left-hand transistor from reaching its cut-off condition and so, by virtue of the cross-link diode 44 prevents the right-hand diode 32 from reaching its saturation condition. Thus the transistors 31, 32, are held at potential short of saturation potentials in turn and so the sluggishness which attaches to the saturation condition of a transistor is obviated.

Figure 5:
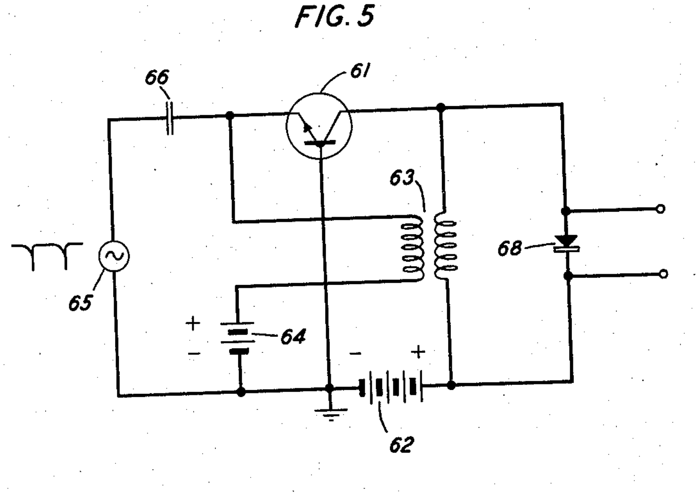
Fig. 5 is a schematic circuit diagram showing the application of a breakdown diode to a single-transistor trigger circuit.

The advantage of restricting the voltage excursions of a transistor trigger circuit to magnitudes short of saturation apply also to circuits employing a single transistor. Fig. 5 shows a well-known example of this class of circuit, namely, a blocking oscillator including a transistor 61, energized by a source 62, in which regenerative feedback is secured through inductive coupling, as by a transformer 63 which couples the collector electrode to the emitter electrode. The operation of such a circuit is too well known to require description. Minor changes of a well-known character cause the circuit to be free running, in which case the trigger pulse source 65 may be omitted if desired, though it may on the other hand be retained as a source of synchronizing pulses.

In accordance with the invention a breakdown diode 68 is connected between two suitable points; e.g., across the primary winding of the coupling transformer 63. It is poled in the direction shown for a P-type transistor 61. For an N-type transistor its polarity, as well as that of the power supply source 62 and the bias source 64, should be reversed. The diode 68 operates in the manner described above to limit the collector voltage swing in one direction to a value short of saturation. Thus, it acts not only to retain the transistor 61 in its linear amplifying range throughout much of each single oscillation, and so to increase the upper operating frequency limit, but it acts at the same time, and by virtue of the same effect, to render the circuit insensitive to the idiosyncracies of individual transistors and so in effect to make the transistors which may be employed as the active elements of the circuit more nearly interchangeable.

Ordinary diodes are frequently used in blocking oscillators to discharge the magnetizing inductance of the transformer and prevent large oscillations after the principal pulse. Diode 68, by virtue of its low resistance in the forward direction, performs this function as it stands in addition to its principal function of preventing saturation in the transistor.

What is claimed is:

1. A non-saturating trigger circuit which comprises a transistor having a semiconductive body, an emitter electrode, a base electrode and a collector electrode, a source of potential for energizing said electrodes, one of said electrodes serving as an input electrode, another of said electrodes serving as an output electrode, and the third of said electrodes serving as a common electrode, an amplifying second transistor having a structure and characteristics like those of said first-named transistor coupling the output electrode to the input electrode for providing regenerative feedback to promote instability, whereby voltage excursions of said output electrode are normally limited on one hand by a cut-off condition and on the other hand by a saturation condition, a threshold-responsive device characterized by a first low resistance condition for voltages across it which are of one polarity and of any magnitude, by a second low resistance condition for voltages across it which are of the opposite polarity and of magnitudes exceeding a preassigned threshold, and by an intermediate high resistance condition, said device being connected between said output electrode and a point of effectively fixed potential lying midway between the potentials of the collector electrodes of said transistors, said device further being poled and adjusted to be in its high resistance condition throughout the greater part of a switching transient oscillation of said circuit and to be driven into its second low resistance condition for output electrode voltages in the neighborhood of, but short of, saturation voltages, a second threshold responsive device having characteristics like those of said first-named threshold responsive device connected in series opposition with said first-named threshold responsive device.

2. A nonsaturating trigger circuit which comprises a transistor having a semiconductive body, an emitter electrode, a base electrode and a collector electrode, a source of potential for energizing said electrodes, one of said electrodes serving as an input electrode, another of said electrodes serving as an output electrode and the third of said electrodes serving as a common electrode, an amplifying second transistor having a structure and characteristics like those of said first-named transistor coupling the output electrode to the input electrode for providing regenerative feedback to promote instability, whereby voltage excursions of said output electrode are normally limited on one hand by a cutoff condition and on the other hand by a saturation condition, a threshold responsive device characterized by a first low resistance condition for voltages across it which are of one polarity and of any magnitude, by a second low resistance condition for voltages across it which are of the opposite polarity and of magnitudes exceeding a preassigned threshold, and by an intermediate high resistance condition, said device being connected between said output electrode and one terminal of said operating potential source, said device further being poled and adjusted to be in its high resistance condition throughout the greater part of a switching transient of oscillation of said circuit and thereby driven into its second level low resistance condition for output electrode voltages in the neighborhod of, but short of, saturation voltages, and a second threshold-responsive device, having characteristics like those of said first-named threshold-responsive device, interconnecting the collector electrode of the first-named transistor with the opposite terminal of said potential source and poled in the same sense with respect to the potential source terminal as said first-named threshold-responsive device.

3. A nonsaturating trigger circuit which comprises a pair of transistors, each having an emitter electrode, a collector electrode and a base electrode, a potential source for supplying energy to said electrodes, impedance elements individually connecting said emitter electrodes to a point of one fixed potential, impedance elements individually connecting said collector electrodes to a point of another fixed potential, a cross-coupling path extending from the collector electrode of each transistor to the base electrode of the other transistor, means including a threshold-responsive device connected to an electrode of at least one of said transistors for restricting the extreme potential excursion of said one electrode to a value less than its normal, operation-limiting, value and, in combination therewith, a substantial non-zero constant-voltage element connected in series in at least one of said cross-coupling paths.

4. A non-saturating trigger circuit which comprises a pair of transistors, each having an emitter electrode, a collector electrode and a base electrode, a potential source for supplying energy to said electrodes, impedance elements individually connecting said emitter electrodes to a point of one fixed potential, impedance elements individually connecting said collector electrodes to a point of another fixed potential, a cross-coupling path extending from the collector electrode of each transistor to the base electrode of the other transistor, means including a threshold-responsive devices connected to an electrode of at least one of said transistors for restricting the extreme potential excursion of said one electrode to a value less than its normal, operation-limiting, value and, in combination therewith, a substantial non-zero constant-voltage element connected in series in each of said cross-coupling paths.

5. In combination with apparatus as defined in claim 3, a condenser connected in shunt with said constant-voltage element.

6. Apparatus as defined in claim 3 wherein said constant-voltage element comprises a threshold-responsive device of which the threshold voltage is adjusted to a value intermediate between said potential source voltage and a voltage of polarity like to that of said potential source and substantially removed from zero.

7. Apparatus as defined in claim 6 wherein said threshold-responsive device comprises a semiconductor PN junction alloy diode.

8. Apparatus as defined in claim 6 wherein said threshold-responsive device is a silicon PN junction alloy diode.

References Cited in the file of this patent

UNITED STATES PATENTS

| | | |
|---|---|---|
| 2,524,953 | Baker | Oct. 10, 1950 |
| 2,605,306 | Eberhard | July 29, 1952 |
| 2,622,212 | Anderson et al. | Dec. 16, 1952 |
| 2,655,608 | Valdes | Oct. 13, 1953 |
| 2,665,845 | Trent | Jan. 12, 1954 |
| 2,718,613 | Harris | Sept. 20, 1955 |
| 2,777,067 | Higby | Jan. 8, 1957 |